REMOTE CONTROLLED ADDER/SUBTRACTER USING CODED FREQUENCY INPUTS
Filed Jan. 18, 1961
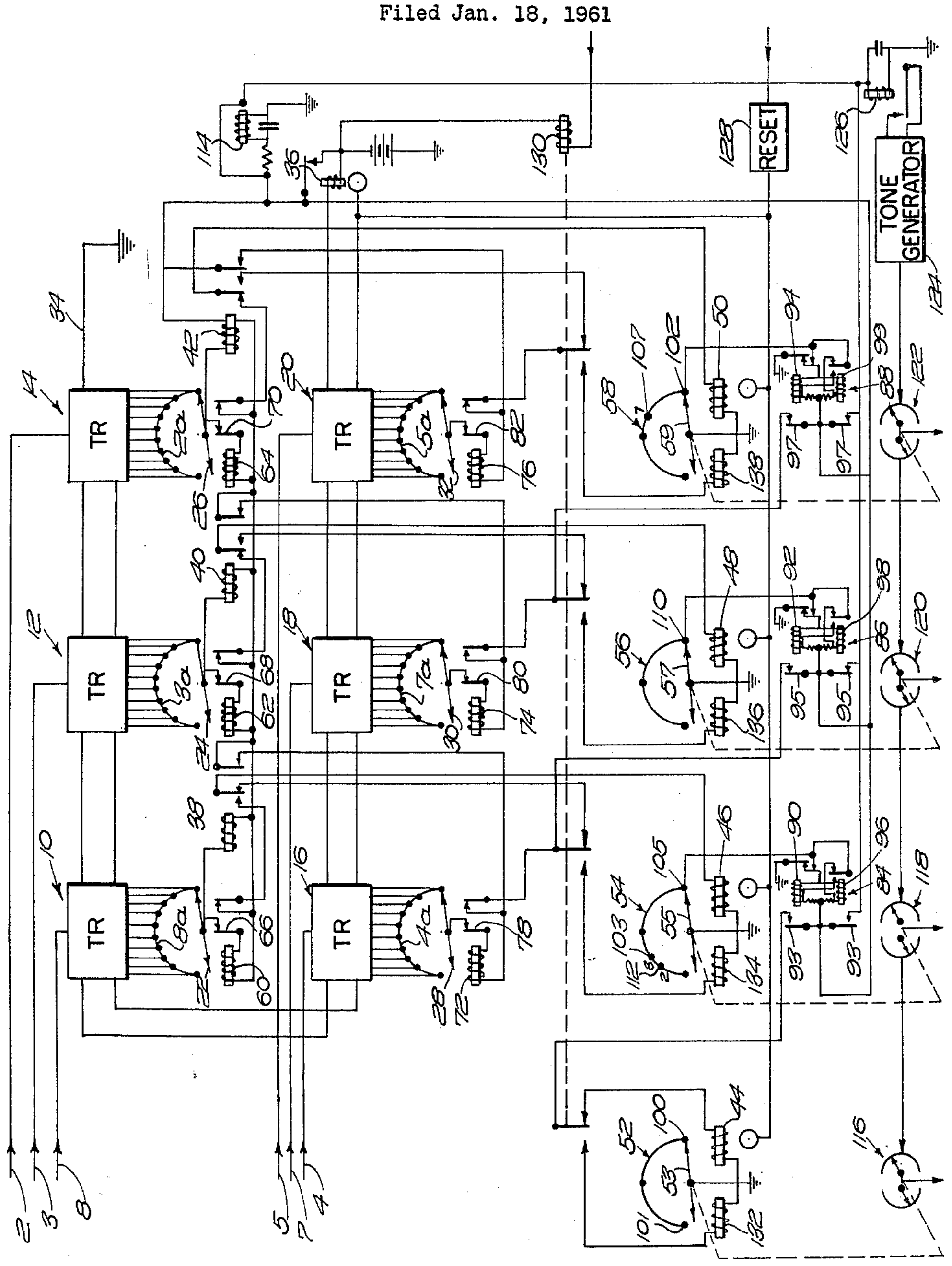
INVENTOR.
Edward Rogal
BY
Morse & Altman
ATTORNEYS United States Patent Office 3,072,333
Patented Jan. 8, 1963

3,072,333
REMOTE CONTROLLED ADDER/SUBTRACTER USING CODED FREQUENCY INPUTS

Edward Rogal, Scituate, Mass., assignor to Universal Controls, Inc., New York, N.Y., a corporation of Maryland Filed Jan. 18, 1961, Ser. No. 83,550
2 Claims. (Cl. 235—168)

The present invention relates to calculating devices and, more particularly, to data processing by novel electrical circuitry in which input data initially and output data finally are stored as designated positions in multiple position switching that itself participates in the data processing sequence. Such circuitry is particularly useful in the arithmetic units of a remote control accounting system of the type disclosed in copending United States patent application Serial No. 784,913, filed January 5, 1959 in the name of Edward Rogal for Central Office Massive Memory Recording System. In this remote control accounting system, increments of incoming and outgoing information are represented as selected carrier frequencies of a group. The circuitry of the present invention is particularly adapted to receive and transmit carrier frequencies of this type.

Objects of the present invention are: to provide, in a device comprising input and output banks of multiple position switches, each including multiple contact means for receiving and individual selector means for designating increments of data, a novel arrangement for interrelating the contact means and selector means of the input and output banks in a simple and reliable manner as required by an accounting system; and to utilize the contact means and selector means of such a device for converting between input and output coded frequencies, by which the device communicates with other components of an accounting system, and for utilizing elemental electrical signals, by which the device processes data internally.

Other objects of the present invention will in part be obvious and will in part appear hereinafter.

The invention accordingly comprises the apparatus possessing the construction, combination of elements and arrangement of parts, which are exemplified in the following detailed disclosure, and the scope of which will be indicated in the appended claims.

For a fuller understanding of the nature and objects of the invention, reference should be had to the following detailed description, taken in connection with the accompanying drawing, wherein there is shown a schematic diagram of a system embodying the present invention.

Generally, the embodiment of the present invention herein illustrated comprises a first bank of multiple position switches for storing digits of an addend, a second bank of multiple position switches for storing digits of an augend or a diminuend and a third bank of multiple position switches for storing digits of the sum. The addition or subtraction operations on the digits of all sequential columns are effected in parallel initially and the carry operations are effected in serial thereafter. The digital increments of input information are received by the first and second banks in the form of selected carrier frequencies which are distributed to various multiple contact points by a simple network of filters to which all carrier frequencies are applied and by which selected carrier frequencies are distributed. The digital increments of output information are transmitted in the form of multiple carrier frequencies which are supplied to multiple contact points and selected by individual selector blades. In the simplest arrangement, distinct carrier frequencies represent distinct input and output digits.

With reference now to the system illustrated in the drawing, different increments of numerical information to be added or subtracted in parallel columns are transmitted to the device in the form of different carrier frequencies. For the purpose of this description, a parallel three column arrangement for effecting addition and subtraction is shown. This description, for clarity, will proceed in reference to the addition of two distinct increments of numerical information having values of "832" and "475."

Three distinct carrier frequencies representing an addend "832" are applied through input leads 2, 3, 8 to frequency translators 10, 12, 14 and three distinct carrier frequencies representing an augend "475" are applied through input leads 5, 7, 4 to translators 16, 18 and 20. These frequency translators function to apply signals corresponding to selected frequencies to selected contacts of the translators. These contacts, in groups of ten terminals each, are associated with the selector blades of stepping switches 22, 24, 26, 28, 30 and 32. Translators 10, 12, 14, 16, 18 and 20 are suitably wired with a common ground 34.

After numbers "832" and "475" are read into translators 10, 12, 14, 16, 18 and 20, a relay 36 is energized for the purpose of closing a series of relays 38, 40 and 42. In the case of addition, a series of clockwise stepping magnets 44, 46, 48 and 50 of four summing switches 52, 54, 56 and 58 are placed in series with interrupters 66, 68 and 70 of stepping switches 22, 24 and 26. Also a series of stepping magnets 60, 62 and 64 of stepping switches 22, 24 and 26 are energized. Stepped switches 22, 24 and 26 are stepped to the contact points of open leads **8*a*, 3*a* and 2*a*. These first contact points, by removing voltage from relays 38, 40 and 42 open, stepping magnets 44, 46, 48 and 50 of summing switches 52, 54, 56 and 58 switch to interrupters 78, 80 and 82 of stepping switches 28, 30 and 32. In consequence, stepping magnets 72, 74 and 76 of stepping switches 28, 30 and 32 are energized. Stepping switches 28, 30 and 32 are stepped to the contact points of open leads 4*a*, 7*a* and 5*a***.

The summing switches are operated as follows. Selector blade 59 of summing switch 58 is moved to seventh contact point 107 as it receives seven pulses including two pulses from open lead **2*a* of stepping switch 26 and five pulses from open lead 5*a* of stepping switch 32. Selector blade 57 of summing switch 56 is moved to zero contact point 110 as it receives ten pulses including three pulses from open lead 3*a* of stepping switch 24 and seven pulses from open lead 7*a* of stepping switch 30. Selector blade 55 of summing switch 54 is moved to second contact point 112 as it receives twelve pulses including eight pulses from open lead 8*a* of stepping switch 22 and four pulses from open lead 4*a* of stepping switch 28. And selector blade 53 of summing switch 52 remains on zero contact point 100** since it has not received pulses from any associated stepping switch.

Since this disclosure refers to the addition of numerical values "832" and "475," carry over must occur. The carry over operation is initiated when power is applied to the circuit by relay 36. Upper relays 90, 92 and 94 of flip-flops 84, 86 and 88 close through grounded selector blades 53, 55, 57 and 59 at zero contact points 100, 105, 110 and 102 of summing switches 52, 54, 56 and 58 respectively. When selector blades 53, 55, 57 and 59 again move to zero contact points 100, 105, 110 and 102, lower relays 96, 98 and 99 close to complete the series circuit through associated contact pairs 93, 93, 95, 95 and 97, 97 from the common carry bus to an associated stepping switch in the next highest order column. For the carry over operation, relays 92, and 98 of relay flip-flop 86 and relays 90 and 96 of relay flip-flop 84 are closed, since selector blades 57 and 55 have contacted zero contact points 110 and 105 of summing switches 56 and 54, respectively.

When the carry over operation is initiated, a time delay relay 114 is energized. After a period of time which allows summing switches 52, 54, 56 and 58 to step to contact points 100, 112, 110 and 107, delay relay 114 is actuated. Delay relay 114 places power on the carry bus which establishes a path through relay flip-flops 86 and 84. In consequence, selector blades 55 and 53 of summing switches 54 and 52 are caused to move one sequential position from their initial contact points.

At this point, summing switch 58 is stepped to seventh contact point 107 as it receives two pulses through stepping switch 26 and five pulses through stepping switch 32. Summing switch 56 is stepped to zero contact point 110 as it receives three pulses through stepping switch 24 and seven pulses through stepping switch 30. Summing switch 54 is stepped to third contact point 112 as it receives eight pulses through stepping switch 22, four pulses through stepping switch 28 and one pulse through relay flip-flop 86. Summing switch 52, on the other hand, is stepped to first contact point 101 as it receives one pulse through relay flip-flop 84.

The correct sum of "1307" as represented by the selector blades of summing switches 52, 54, 56 and 58 is then encoded in a frequency code by converting switches 116, 118, 120 and 122, which are ganged to the selector blades and fed by a tone generator 124. Then pulse that initiates the carry over operation also establishes a path to a gate relay 126, which is associated with tone generator 124 for the purpose of reading out the sum of "1307." After the sum is recorded at its destination, a reset pulse is transmitted back to the device through a reset transmitter 128 which operates through suitable auxiliary solenoids 129, in order to reset all switches back to zero contact points and releasing relay 36, which initially energized the electrical system.

Now subtraction by means of the illustrated device now will be described briefly in terms of the numerical values of "832" and "475." Initially, add-subtract relay 130 is released. Next, relay 130 disconnects clockwise stepping magnets 44, 46, 48 and 50 of summing switches 52, 54, 56 and 58 and connects a series of counterclockwise stepping magnets 132, 134, 136 and 138. Next, summing switches 52, 54, 56 and 58 run clockwise when "832" is read in and run counterclockwise when "475" is read in. Finally, the remaining subtraction steps are similar in all respects to the corresponding addition steps except that the carry over pulses move summing switches 52, 54, 56 and 58 back one position to give the correct difference of "0357."

Since certain changes may be made in the above system without departing from the scope of the invention herein involved it is intended that all matter contained in the above description or shown in the accompanying drawing shall be interpreted in an illustrative and not in a limiting sense.

What is claimed is:

1. A calculating device comprising a plurality of first stepping switches, a plurality of second stepping switches and a plurality of third stepping switches, each of said first stepping switches, said second stepping switches and said third stepping switches including a contact element, a series of contact terminals and an electromagnetic drive for stepping said contact element incrementally through said series of contact terminals in response to a series of signals, first filter means for applying signals to selected contact terminals of said plurality of first stepping switches in response to selected coded signals applied thereto, second filter means for applying signals to selected contact terminals of said plurality of second stepping switches in response to selected coded signals applied thereto, a plurality of output switches each including a selector component and multiple position component, said selector component being operatively connected to scan said multiple position component for selection among a plurality of coded signals, one each of said output switches being ganged to one each of said third stepping switches, a first control circuit for simultaneously causing said contact elements of said first stepping switches to step incrementally through said contact terminals of said first stepping switches and for causing said selector components of said output switches to scan said multiple position components of said output switches, a second control circuit for simultaneously causing said contact elements of said second stepping switches to step incrementally through said contact terminals of said second stepping switches and for causing said selector components of said output switches to scan said multiple position components of said output switches, and a master control circuit for causing said first control circuit to operate first in time and for causing said second control circuit to operate second in time.

2. The calculating device of claim 1 wherein said first control means is operative to apply a sequence of pulses simultaneously to the electromagnetic drives of said first stepping switches and the electromagnetic drives of said third stepping switches and said second control means is operative to apply a sequence of pulses simultaneously to the electromagnetic drives of said second stepping switches and the electromagnetic drives of said third stepping switches.

References Cited in the file of this patent

UNITED STATES PATENTS

| | | |
|---|---|---|
| 2,427,383 | Bryce | Sept. 16, 1947 |
| 2,617,589 | Jones | Nov. 11, 1952 |